(12) United States Patent
Kuntze (10) Patent No.: US 11,233,370 B2
(45) Date of Patent: Jan. 25, 2022

(54) DEVICE FOR GENERATING LASER RADIATION

(71) Applicant: Compact Laser Solutions GmbH, Berlin (DE)

(72) Inventor: Andreas Kuntze, Berlin (DE)

(73) Assignee: COMPACT LASER SOLUTIONS GMBH, Berlin (DE)

( * ) Notice: Subject to any disclaimer, the term of this patent is extended or adjusted under 35 U.S.C. 154(b) by 86 days.

(21) Appl. No.: 16/762,255

(22) PCT Filed: Nov. 8, 2018

(86) PCT No.: PCT/EP2018/080599
§ 371 (c)(1),
(2) Date: May 7, 2020

(87) PCT Pub. No.: WO2019/092097
PCT Pub. Date: May 16, 2019

(65) Prior Publication Data
US 2021/0119398 A1    Apr. 22, 2021

(30) Foreign Application Priority Data
Nov. 9, 2017  (DE) .......................... 102017126291.1

(51) Int. Cl.
*H01S 3/10*    (2006.01)
*H01S 3/02*    (2006.01)
(Continued)

(52) U.S. Cl.
CPC ............ *H01S 3/025* (2013.01); *H01S 3/0092* (2013.01); *H01S 3/08059* (2013.01);
(Continued)

(58) Field of Classification Search
CPC .... H01S 3/025; H01S 3/0092; H01S 3/08059; H01S 3/109; H01S 3/106; H01S 3/11; H01S 3/005; H01S 3/0071
See application file for complete search history.

(56) References Cited

U.S. PATENT DOCUMENTS 5,825,562 A    10/1998  Lai et al.
6,178,188 B1 *  1/2001  Jing .................... H01S 5/02326
                                                        372/36
(Continued)

FOREIGN PATENT DOCUMENTS

DE    102012202170 A1    6/2013
DE    102014218353 A1    3/2016
(Continued)

OTHER PUBLICATIONS

English translation of International Search Report and Written Opinion, for International Application No. PCT/EP2018/080599, dated Feb. 15, 2019, 17 pages.
(Continued)

*Primary Examiner* — Kinam Park
(74) *Attorney, Agent, or Firm* — Westman, Champlin & Koehler, P.A.

(57) ABSTRACT

A device for generating laser radiation includes a resonator, an optical assembly, and an adjustment device is provided. The optical assembly includes a movably arranged support element on which optical components are arranged, wherein an optical component is a device for deflecting laser radiation. The device for deflecting laser radiation of the optical assembly is arranged in the beam path of laser radiation generated by the resonator. The adjustment device changes the position of the optical assembly from a first position to another position relative to the resonator, wherein the position of the beam path of laser radiation emanating from the optical assembly in the first position remains unchanged by
(Continued)

the adjustment of the optical assembly to the other position relative to the resonator. A corresponding method is also provided.

12 Claims, 6 Drawing Sheets

(51) Int. Cl.
| | |
|---|---|
| *H01S 3/00* | (2006.01) |
| *H01S 3/08* | (2006.01) |
| *H01S 3/109* | (2006.01) |
| *H01S 3/106* | (2006.01) |
| *G02F 1/35* | (2006.01) |
| *H01S 3/11* | (2006.01) |

(52) U.S. Cl.
CPC .............. *H01S 3/106* (2013.01); *H01S 3/109* (2013.01); *G02F 1/3503* (2021.01); *G02F 1/3525* (2013.01); *H01S 3/005* (2013.01); *H01S 3/0071* (2013.01); *H01S 3/11* (2013.01)

(56) References Cited

U.S. PATENT DOCUMENTS

| | | | |
|---|---|---|---|
| 6,859,335 B1 | 2/2005 | Lai et al. | |
| 7,183,674 B2 | 2/2007 | Koorneef et al. | |
| 7,750,266 B2 * | 7/2010 | Dane | B23K 26/356 |
| | | | 219/121.6 |
| 8,885,246 B2 | 11/2014 | Horain et al. | |
| 9,429,814 B2 | 8/2016 | Zanger | |
| 9,696,518 B2 | 7/2017 | Hembacher | |
| 2002/0027932 A1 | 3/2002 | Takada | |
| 2005/0068998 A1 | 3/2005 | Katsura et al. | |
| 2006/0102609 A1 * | 5/2006 | Dane | B23K 26/702 |
| | | | 219/121.85 |
| 2011/0181857 A1 * | 7/2011 | Bieg | G02B 7/02 |
| | | | 355/67 |
| 2013/0242282 A1 * | 9/2013 | Hembacher | G03F 7/7015 |
| | | | 355/77 |
| 2014/0114295 A1 * | 4/2014 | Stobrawa | A61F 9/008 |
| | | | 606/4 |
| 2016/0079725 A1 * | 3/2016 | Zanger | H01S 3/108 |
| | | | 372/21 |

FOREIGN PATENT DOCUMENTS

| | | |
|---|---|---|
| FR | 2547524 A1 | 12/1984 |
| JP | 2006317724 A | 11/2006 |

OTHER PUBLICATIONS

International Search Report and Written Opinion, for International Application No. PCT/EP2018/080601, dated Feb. 13, 2019, 12 pages.

* cited by examiner a)

Fig. 7

DEVICE FOR GENERATING LASER RADIATION

CROSS-REFERENCE TO RELATED APPLICATION(S)

This application is a Section 371 National Stage Application of International Application No. PCT/EP2018/080599, filed on Nov. 8, 2018, entitled "DEVICE FOR GENERATING LASER RADIATION", which published as WO 2019092097 A1, on May 16, 2019, and claims priority to German Patent Application No. 102017126291.1, filed on Nov. 9, 2017, the disclosures of which are incorporated herein by reference in their entireties.

TECHNICAL FIELD

The invention relates to a device for generating laser radiation comprising a resonator, an optical assembly and an adjustment device being capable of changing the relative position of the optical assembly from a first position to another position relative to the resonator, as well as to a corresponding method.

BACKGROUND

High-energy UV lasers are widely used in science and technology, e.g., for micro material processing, marking, semiconductor processing, manufacturing of solar cells, structuring of ITO and TCO layers, glass and ceramics processing and many other things. Optical components such as mirrors, prisms, gratings, but also non-linear optical crystals for generating higher harmonics, which are exposed to the intensive laser radiation being rich of energy, are subject to a deterioration of the used materials and thus to a decline of their optical properties. On the one hand, dust particles can burn into the components and reduce or completely destroy the reflectance of mirrors. On the other hand, the surfaces of the non-linear optical crystals can be changed chemically in such a manner that an effective conversion of the primary laser radiation is no longer present. The consequence is a reduced efficiency of the laser. This deterioration of the efficiency of the optical components is basically restricted to the diameter of the laser beam, which is normally between 1 μm and 1000 μm. In technology there exist methods for increasing the lifetime of the optical components and thus maintaining the efficiency of the laser system.

U.S. Pat. No. 8,885,246 B2 relates to a device for turning or rotating optical components of one or more plane-parallel optical plates so that in the non-linear optical crystal other areas in which the performance is not reduced are penetrated by the laser radiation. U.S. Pat. No. 5,825,562 describes a mechanical system in which an optical component is continuously rotated by a motor in such a manner that the optical component follows a rotating spiral path. These movements can be controlled by a computer program as described, e.g., in U.S. Pat. No. 6,859,335 B1.

SUMMARY

The methods presented hereinabove have disadvantages. Only one optical component can be adjusted at a time. For increasing the lifetime of a plurality of components, the adjustment device must be attached to each optical component. Often it is desirable to accommodate the optical components in a protective housing and evacuate the air remaining in the housing or flush it with purified air or gases in order to reduce, e.g., the lifetime-reducing degassing products of other components and dust particles of the optical system. The mechanical system necessary for the adjustment device is then also accommodated in the housing, can degas and contaminate the optical components. This is important in particular for the lifetime of laser systems operating in the UV range and adjacent wavelengths. Moreover, the adjustment device must be fine-adjusted at and with each optical component. The methods presented herein for increasing the lifetime of optical components in a laser system are also involved in view of mounting and operation and, therefore, cost-intensive.

Therefore, it is an object of the present invention to provide an adjustment device which leads to an increased lifetime of the system, the design of which is compacter, and which is consequently more cost-efficient and can be handled more easily than solutions known so far.

The object of the invention is achieved by a device according to the independent claim.

The device for generating laser radiation according to the invention comprises the resonator which generates the primary laser radiation, an optical assembly as well as an adjustment device. The optical components are combined spatially in an optical assembly. The optical assembly comprises one or more optical components which can comprise, e.g., a frequency conversion device with one or more crystals, mirror, lens, prism, Brewster window and combinations thereof, which are arranged in a device in such a manner that they deflect the laser beam and thus lie in the beam path of the laser radiation generated by the resonator. Optionally, the optical assembly can be arranged in an airtight chamber. The optical assembly moreover comprises a movably arranged support element on which the device for deflecting the laser radiation is arranged. By means of the adjustment device, the position of the optical assembly is changed relative to the resonator in such a manner that, when the laser beam emanates from the optical assembly, the position and direction of the beam path are not changed by the adjustment of the position of the optical assembly.

During operation, optical components can be subject to a changing and/or aging process. This aging process depends on the contamination by even very small particles and also on the energy or wavelength of the used laser radiation and leads to intensity losses of the laser radiation. In addition to the particles that can deposit on the optical components, it is also possible that aromatics, substances and materials which can be changed in particular by UV radiation possibly also chemically degas from the elements used in the device for generating laser radiation and deposit on the optical components. By the laser radiation, they can then evaporate on and/or be burnt in the optical components, or they affect the reflection or absorption and the efficiency of the device. Moreover, by the laser radiation, micro defects in the crystals can lead to crystal defects. Furthermore, also solarization/color centers or other damage can lead to efficiency losses due to local degradation of the optical components. By adjusting the optical assembly, the laser beam is caused to hit different spots of the optical components so that the intensity of the laser radiation is maintained also for a long period of time. And thus the lifetime of the optical components is increased. The entire optical assembly arranged on the support element is adjusted, it is not necessary to adjust individual optical components as known in the prior art. However, it is conceivable that the optical assembly comprises only one optical component. Therefore, the construction of the presented adjustment device according to the invention is more cost-efficient, more compact, and can be handled more easily. In the simplest case, the adjustment can be performed manually; a motor drive is not necessary but can be retrofitted easily, if necessary. Moreover, it is not necessary to fine-adjust the optical components before installation of the adjustment device because the optical components are already fine-adjusted within the optical assembly. The optical assembly can also be accommodated in a dust-protected housing with optical decoupling windows for the laser beam, in which the optical components are protected from external contamination.

Further developments of the invention relating to the device for generating laser radiation are presented in the dependent claims.

In a further embodiment of the invention, the optical assembly is configured such that it comprises a device for frequency conversion of the laser radiation. For generating laser radiation in the UV range, normally the laser beam is irradiated into a non-linear crystal, e.g. LBO, BBO, KTP etc., with high energy densities. By the high intensity of the laser radiation in a small area (beam diameter normally about 1 μm to 1000 μm), the non-linear crystal can be altered irreversibly in the active area of the laser beam and its mode of action can be affected considerably. By means of the adjustment device of the optical assembly, the device for converting the frequency is adjusted by an amount so that the laser beam is directed through an undamaged area of the device for multiplying the frequency without the position of the beam path being changed.

In a further advantageous embodiment of the invention, the adjustment device of the optical assembly is configured such that the relative position of the optical assembly relative to the resonator is adjustable by the adjustment device from a first position to a plurality of other positions without the position of the beam path being changed. This configuration increases the lifetime of the optical assembly considerably. In this manner, any desired undamaged spot on the optical component, e.g. a non-linear crystal, can be chosen and arranged in the beam path of the laser system.

With a typically assumed front face of, e.g., 3 by 3 mm and an assumed diameter of the laser beam of 100 μm, thus more than 100 spots can be penetrated by the laser beam one after the other without significant efficiency losses of the laser beam.

In order not to change the beam path of the laser beam, the adjustment device can translate the optical assembly only along defined directions. In a further embodiment of the invention, the adjustment device is therefore configured such that the optical assembly is adjusted parallel to the surface of the device for deflecting the laser radiation. If the optical assembly is formed, e.g., by a mirror, the adjustment is realized parallel to the mirror surface.

In a further embodiment of the invention, the adjustment device is configured such that the optical assembly is adjusted perpendicularly with respect to the beam plane of the device for deflecting the laser radiation. If the optical assembly is formed, e.g., by a mirror, the adjustment is realized in such a perpendicular manner with respect to the beam plane that the position of the target area of the laser beam on the mirror changes but the position of the beam path is not changed.

In a further embodiment of the invention, the adjustment device is configured such that the optical assembly is adjusted parallel to the beam plane of the device for deflecting the laser radiation. By combining the adjustment of the optical assembly perpendicularly with respect to the beam plane and parallel to the beam plane, the optical assembly can be adjusted by the adjustment device three-dimensionally, i.e. in all three spatial axes, so that undamaged areas on the optical components are adjusted in the beam path of the laser beam without changing the position of the beam path. This leads to a clear increase in the lifetime of the optical components.

In a further embodiment of the invention, the optical assembly comprises a second device for deflecting the laser radiation. Different optical components (non-linear crystals, mirrors, lenses, prisms and combinations thereof, OPOs) can, depending on the kind and purpose of use of the device for generating a laser beam, be combined in an optical assembly which comprises a plurality of optical components. The optical assembly is arranged on the movable support element, which is configured to be movable relative to the laser beam generated in the resonator by means of the adjustment device. Thus, the optical assembly can be adjusted without the position of the beam path being changed. In this manner, an increased lifetime of the optical components is achieved for each combination of the optical components. The optical components can be arranged in any desired angular position relative to each other and also relative to the laser radiation.

In a further embodiment of the invention, the surfaces of the two devices for deflecting the laser radiation which deflect the laser radiation are arranged in parallel. The laser beam emanates from the optical assembly parallel to the laser beam generated by the resonator in a manner offset laterally by a specific amount. By means of the adjustment device, the optical assembly is adjusted with the two devices for deflecting the laser radiation without the position of the beam path being changed.

In a further embodiment of the invention, the adjustment device is configured such that the optical assembly is adjusted parallel to the beam plane of the laser radiation. If the optical assembly is formed, e.g., by two mirrors arranged in parallel, the optical assembly is adjusted along the laser beam incident from the resonator. This translational movement does not change the position of the beam path.

In a further embodiment of the invention, the adjustment device is configured such that the optical assembly is adjusted perpendicularly with respect to the surface of the second device for deflecting the radiation.

If the optical assembly is formed, e.g., by two mirrors arranged in parallel, the optical assembly is moved perpendicularly with respect to the surface of the second mirror in the beam path of the laser so that the position of the beam path is not changed. In this arrangement, the linear adjustment can be realized in all spatial directions without the position of the emanating laser beam being changed.

In a further embodiment of the invention, the adjustment device is configured such that the optical assembly is adjusted perpendicularly with respect to the beam path of the laser radiation incident on the optical assembly. If the optical assembly is formed, e.g., by two mirrors arranged in parallel, the optical assembly is moved perpendicularly with respect to the beam path of the incident laser beam and the position of the beam path is not changed.

The object of the invention is moreover solved by a method according to the independent method claim.

In the method for improving the lifetime of a device for generating laser radiation according to the invention, an optical assembly is moved relative to the resonator from a first position to a second position. The optical assembly comprises at least a component which serves as device for deflecting the laser beam and is located in the beam path of the laser beam generated by the resonator. The optical assembly is mounted on a movably arranged support element. By the movement, the position of the target area of the laser radiation on the optical components is changed. By means of the adjustment device, the position of the optical assembly relative to the resonator is changed in such a manner that the position of the beam path is not changed by the adjustment of the position of the optical assembly. Because of the adjustment of the optical assembly, an adjustment of individual optical components is not necessary. Therefore, the construction of the adjustment device according to the invention is compacter, can be produced more cost-efficiently and handled more easily than solutions known from the prior art. The adjustment can be realized manually, a motor drive can be retrofitted easily. A fine-adjustment of the optical components before installation of the adjustment device is superfluous. Moreover, also the lifetime of the used optical components is increased because the position of the incident laser beam is changed by the changed position of the optical components arranged on the support element.

Further embodiments of the invention relating to the method are discussed in the dependent method claims.

In a further embodiment of the invention, the method for improving the lifetime of a device for generating a laser radiation is realized such that the optical assembly is adjusted relative to the resonator from a first position to further positions without the position of the beam path being changed. This embodiment increases the lifetime of the optical assembly many times. Thus, it is possible to search for any desired undamaged spot on the optical component and position it in the beam path of the laser system.

In a further embodiment of the invention, the method for improving the lifetime of a device for generating laser radiation is realized such that it comprises a device for converting the frequency of the laser radiation. For generating laser radiation in the UV range, normally the laser beam is focused into a non-linear crystal. By the high intensity of the laser radiation in a small area (beam diameter normally about 1 μm to 1000 μm), the non-linear crystal can be changed irreversibly in the target area of the laser beam and its mode of action can be affected considerably. By means of the adjustment device of the optical assembly, the device for converting the frequency is adjusted by an amount so that the laser beam is directed through an undamaged area of the device for converting the frequency without the position of the beam path being changed.

In a further embodiment of the invention, the method for improving the lifetime of a device for generating laser radiation is realized such that the optical assembly is adjusted parallel to the surface of the device for deflecting the laser radiation. If the optical assembly is formed, e.g., by a mirror, the adjustment is realized parallel to the mirror surface without changing the position of the beam path.

In a further embodiment of the invention, the method for improving the lifetime of a device for generating laser radiation is realized such that the optical assembly is adjusted perpendicularly with respect to the beam plane of the device for deflecting the laser radiation. If the optical assembly is formed, e.g., by a mirror, the adjustment is realized in such a perpendicular manner with respect to the beam plane that the position of the target area of the laser beam on the mirror changes but the position of the following beam path is not changed.

In a further embodiment of the invention, the method for improving the lifetime of a device for generating laser radiation is realized such that the optical assembly is adjusted parallel to the beam plane of the laser radiation. If the optical assembly is formed, e.g., by a common mirror, the optical assembly is adjusted along the laser beam incident from the resonator. This translational movement does not change the position of the beam path. Optionally, movement can also be realized by adjusting an individual mirror or a further assembly.

In a further embodiment of the invention, the method for improving the lifetime of a device for generating laser radiation is realized such that the optical assembly comprises a second device for deflecting the laser radiation. This second device for deflecting the laser radiation is moved together with the optical assembly. Different optical components (non-linear crystals, mirrors, lenses, prisms and combinations thereof) can, depending on the kind and purpose of use of the device for generating a laser beam, be combined in an optical assembly. The optical assembly is arranged on the movable support element which is movable relative to the laser beam generated in the resonator by means of the adjustment device without the position of the beam path being changed. In this manner, an increased lifetime of the optical components is achieved for each combination of the optical components.

In a further embodiment of the invention, the method for improving the lifetime of a device for generating laser radiation is realized such that the optical assembly is adjusted parallel to the beam plane of the laser radiation. If the optical assembly is formed, e.g., by two mirrors arranged in parallel, the optical assembly is adjusted along the laser beam incident from the resonator. This translational movement does not change the position of the beam path.

In a further embodiment of the invention, the method for improving the lifetime of a device for generating laser radiation is realized such that the optical components are adjusted perpendicularly with respect to the surface of the device for deflecting the radiation. If the optical assembly is formed, e.g., by to mirrors arranged in parallel, the optical assembly is moved perpendicularly with respect to the surface of the second mirror in the beam path of the laser, so that the position of the beam path is not changed.

In a further embodiment of the invention, the method for improving the lifetime of a device for generating laser radiation is realized such that the optical assembly is adjusted perpendicularly with respect to the beam path of the laser radiation incident on the optical assembly. If the optical assembly is formed, e.g., by two mirrors arranged in parallel, the optical assembly is moved perpendicularly with respect to the beam path of the incident laser beam so that the position of the beam path is not changed.

BRIEF DESCRIPTION OF THE ACCOMPANYING DRAWINGS

Embodiments of the sensor device according to the invention and the method according to the invention are shown in the drawings in a schematically simplified manner and are discussed in more detail in the following description.

DETAILED DESCRIPTION

Figure 1:
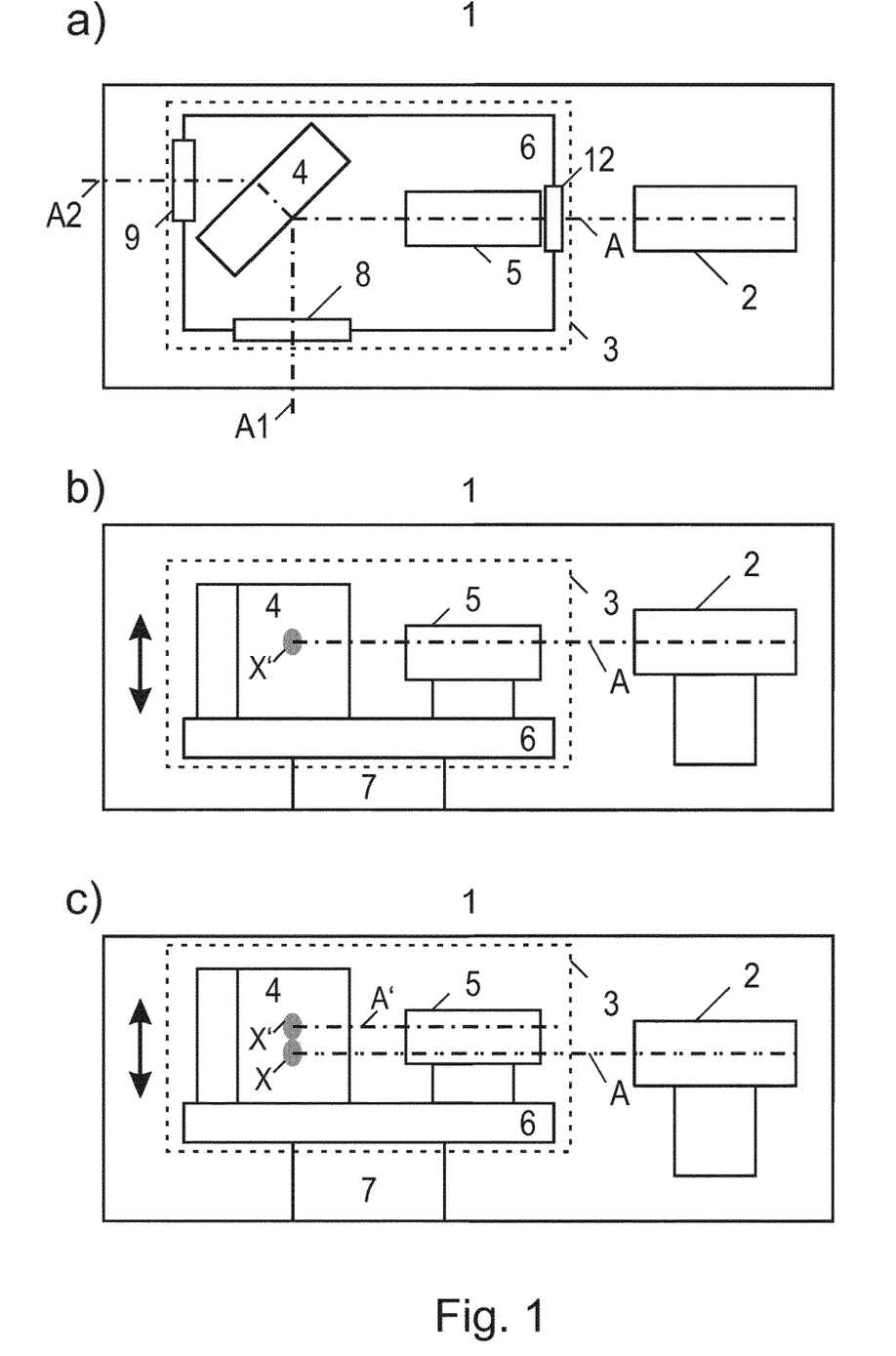
FIG. 1a shows a top view of a device for generating laser radiation with an optical assembly
FIG. 1b shows a side view of a device for generating laser radiation
FIG. 1c shows a side view of a device for generating laser radiation after movement of the optical assembly in the vertical direction

The device for generating laser radiation 1 (FIG. 1) comprises a resonator 2 generating the primary laser radiation A and an optical assembly 3. The optical assembly 3 comprises a device for deflecting the laser radiation 4 and a device for converting the frequency of the laser radiation 5. Moreover, the optical assembly comprises a Brewster window 8 as well as a coupling window 12 and is arranged in an airtight chamber. Both devices 4, 5 lie in the beam path of the laser radiation A generated by the resonator 2. The optical assembly 3 is firmly connected to a movable support element 6 and is adjustable in the vertical direction by means of the adjustment device 7. In an optional embodiment, the Brewster window can also be an antireflection (AR) coated window or a window without AR coating. In this embodiment, the device for deflecting the laser radiation is configured as a high-transmission separator mirror for the wavelengths of 1064 nm and 532 nm. To the wavelength of 355 nm, the device for deflecting the laser radiation 4 is highly reflecting. While the laser radiation having the wavelength of 355 nm A1 is decoupled from the Brewster window 8, the laser radiation A2 having the wavelengths of 1064 nm and 532 nm is decoupled from the decoupling window 9.

Normally, a solid state laser such as a neodymium-doped laser crystal generates the primary laser radiation A. However, also diode lasers, gas lasers or excimer lasers are possible. In general, any laser is suitable for generating a primary radiation. For multiplying the frequency of the primary laser radiation, non-linear crystals such as LBO, BBO, KTP etc. are used for generating the second or third harmonics. In particular wavelengths in the visible green wavelength range or in the UV range are interesting from a technical point of view. The device for deflecting the laser radiation 4 is formed by a mirror or combinations of mirrors, gratings, lenses and/or prisms, which deflect the primary laser beam A in a direction.

Devices of this kind are subject to aging processes which primarily depend on the contamination of the optical components and the energy of the used laser radiation. The particle deposited on the optical components is burnt by the high-energy laser radiation and can thus destroy the surface of the optical components, which leads to efficiency losses. For being protected against external influences, e.g. dirt, the optical assembly 3 is ideally mounted in a housing in which suitably arranged optical windows are transparent to the laser radiation A. The optical assembly 3 can be adjusted, e.g., manually when the intensity of the laser beam A falls below a predetermined value. Also an electromotive adjustment is conceivable. Then, adjustment can be realized automatically by means of a program controlled adjustment as known in the prior art. The method can also be automated in that a sensor monitors the performance data of the system and, if necessary, carries out the adjustment.

The optical assembly 3 can be adjusted from a first position to a further second position by means of the movable support element 6. In this embodiment, the adjustment is realized in a vertical direction parallel to the surface of the device for deflecting the laser radiation 4 in order not to change the position of the beam path by the adjustment (FIGS. 1b, 1c). However, the position of the target area of the laser radiation A on the device for deflecting the laser radiation 4 is changed from the position X' to the position X. From this second position, the optical assembly 3 can be adjusted to further positions. On the optical components of the optical assembly 3, thus an undamaged spot can be adjusted in the beam path of the laser radiation A generated by the resonator 2. The beam path of the laser radiation before adjustment of the assembly A' is also shown in FIG. 1c.

Figure 2:
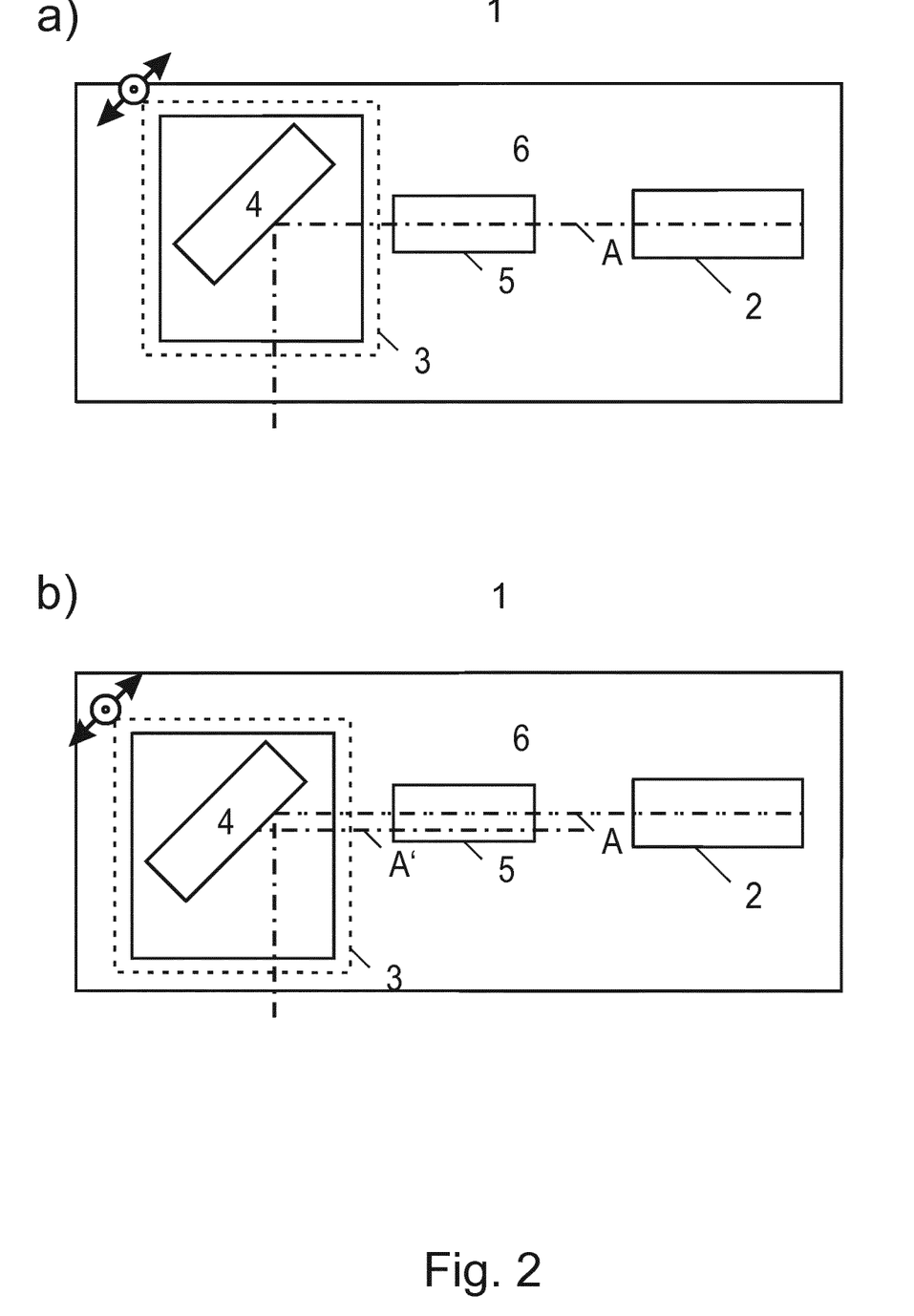
FIG. 2a shows a side view of a device for generating laser radiation
FIG. 2b shows a side view of a device for generating laser radiation after movement of the optical assembly in the horizontal direction

As shown in the second embodiment (FIG. 2), the device for converting the frequency of the laser radiation 5 can be arranged outside the optical assembly 3 and is not adjustable by the movable support element 6. By the adjustment by the adjustment device 7 of the optical assembly 3, in this case only the lifetime of its components is increased but not that of the device for converting the frequency of the laser radiation 5. Depending on the number and arrangement of the optical components in the optical assembly 3, this arrangement allows for a compacter construction of the adjustment device 7 compared to that described in the first embodiment. The device for converting the frequency of the laser radiation 5, however, can also be mounted in the optical assembly 3 and, in this case, is then also adjustable by the adjustment device 7. The device for deflecting the laser radiation 4 is formed by a mirror or optical components which deflect the laser beam A in a direction. In this embodiment, the adjustment is realized parallel to the surface of the device for deflecting the laser radiation 4 in the horizontal and/or vertical direction (see arrows in the drawing). The position of the beam path is not changed by the adjustment (FIG. 2b); the position of the target area of the laser radiation A on the device for deflecting the laser radiation 4 is changed. The beam path of the laser radiation before adjustment of the assembly A' is also shown in FIG. 2b.

Figure 3:
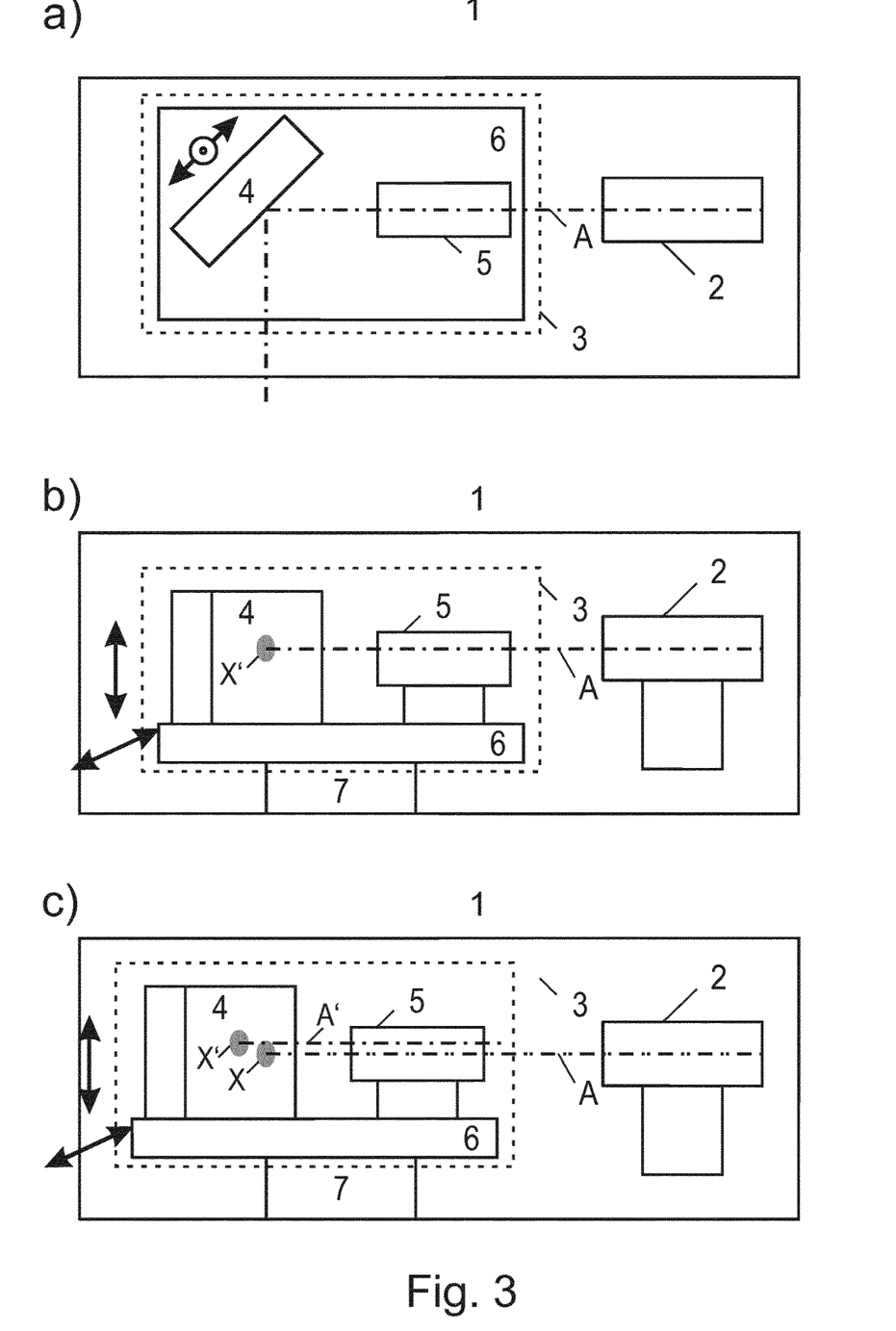
FIG. 3a shows a top view of a device for generating laser radiation with an optical assembly
FIG. 3b shows a side view of a device for generating laser radiation
FIG. 3c shows a side view of a device for generating laser radiation after movement of the optical assembly in the vertical and horizontal directions

The adjustment device 7 can be configured such that it adjusts the optical assembly 3 relative to the resonator 2 in the vertical and/or horizontal direction by the support element 6 (FIG. 3, arrows). By a combination of the adjustment of the optical assembly 3 in the vertical and the horizontal direction parallel to the surface of the device for deflecting the laser radiation 4 from a first position to further positions, an undamaged spot on the entire surface of both the device for deflecting the laser radiation 4 and the device for converting the frequency of the laser radiation 5 can be adjusted in the beam path of the laser radiation A generated by the resonator 2. The lifetime of the optical components is clearly increased by this arrangement as compared to non-adjustable constructions. The position of the target area of the laser radiation A on the device for deflecting the laser radiation 4 changes due to the adjustment from the position X' to the position X (FIG. 3b), the position of the beam path is not changed by the adjustment. The beam path of the laser radiation before adjustment of the assembly A' is also shown in FIG. 3c.

Figure 4:
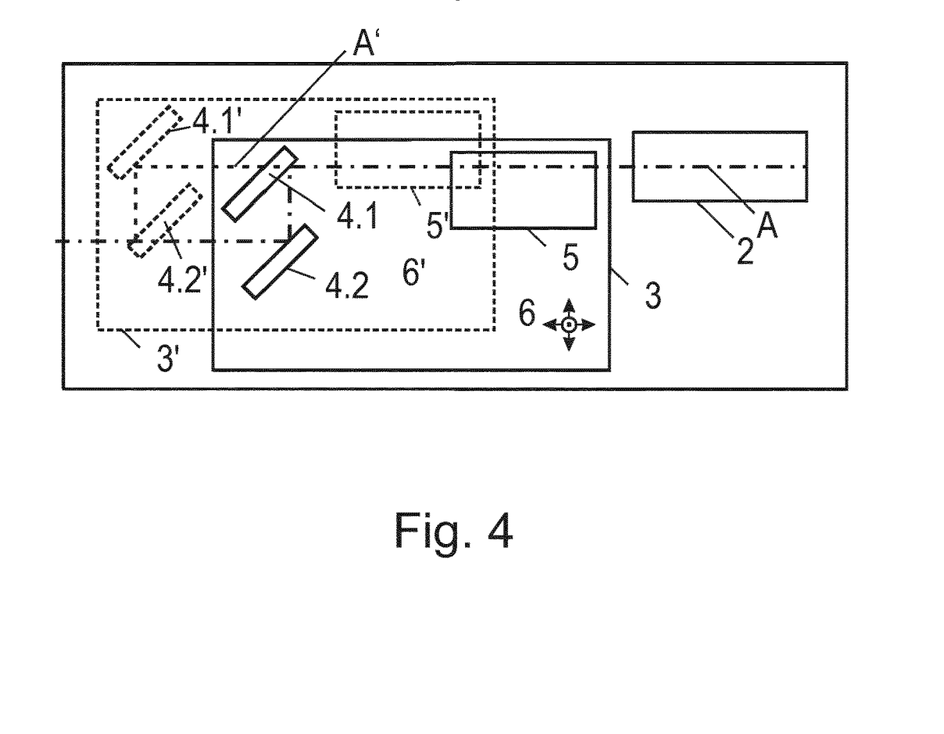
FIG. 4 shows a view of a device for generating laser radiation with two mirrors

FIG. 4 shows an arrangement of the device for generating laser radiation 1 according to the invention with two devices for deflecting the laser radiation 4.1, 4.2 being arranged in parallel. The resonator 2 generates the primary laser radiation A. A device for converting the frequency of the laser radiation 5 as well as the devices for deflecting the laser radiation 4.1, 4.2 lie in the beam path. In this configuration with two devices for deflecting the laser radiation 4.1, 4.2 arranged in parallel, e.g. two mirrors arranged in parallel, the primary laser radiation A is deflected in such a manner that the laser beam A emanating from the optical assembly 3 extends parallel to the laser beam A generated by the resonator 2. The optical assembly 3 is permanently connected to a movable support element 6 and adjustable in all three spatial directions (see arrows) by means of the adjustment device 7. The dashed lines show a second position of the optical assembly 3' with the support element 6', the device for converting the frequency 5' of the laser radiation A and two devices for deflecting the laser radiation 4.1', 4.2' as elements of the optical assembly 3'.

According to the third embodiment, the adjustment device 7 can be configured such that an adjustment in the vertical direction is possible. By means of the adjustment device 7, the optical assembly 3 with the two devices for deflecting the laser radiation 4.1, 4.2 is adjusted without the position of the beam path being changed. For this purpose, the optical assembly 3 is adjusted parallel to the surfaces of the devices for deflecting the laser radiation 4.1, 4.2. The positions of the target areas of the laser radiation A on the device for deflecting the laser radiation 4 are changed by the adjustment. By a combination of the adjustment in the vertical and the horizontal direction parallel to the surfaces of the devices for deflecting the laser radiation 4.1, 4.2, an undamaged spot can be adjusted into the beam path of the laser radiation A generated by the resonator 2. The beam path of the laser radiation before adjustment of the assembly A' is also shown in FIG. 4.

Figure 5:
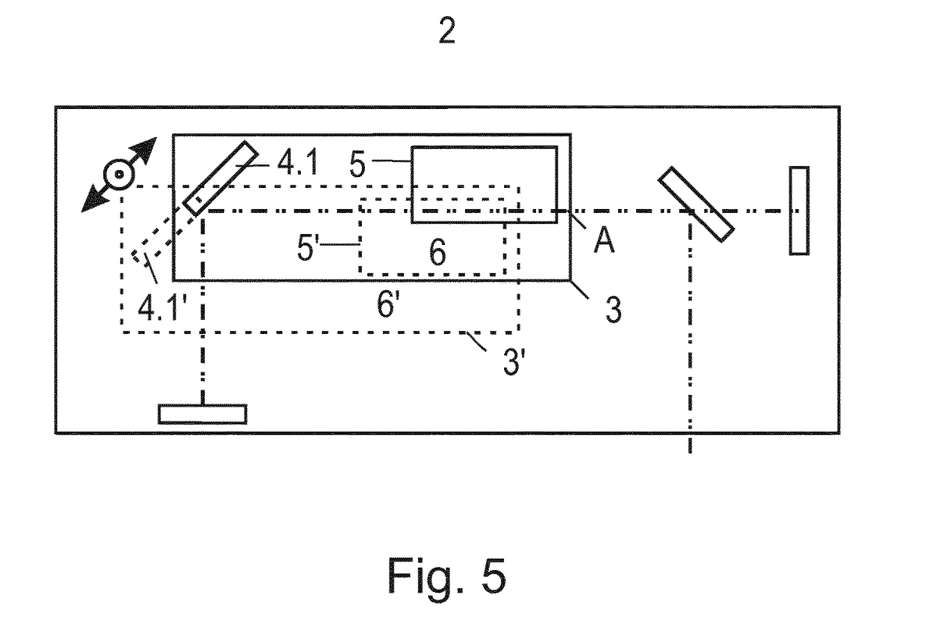
FIG. 5 shows a view of a device for generating laser radiation with an optical assembly arranged in the resonator

FIG. 5 shows an arrangement according to the invention in which the adjustable optical assembly 3 is arranged inside the resonator 2. In this case, the optical assembly comprises a support element 6 and the device for deflecting the laser radiation A arranged on the support element 6 as well as a device for converting the frequency of the laser radiation A. By adjusting the optical assembly 3 to a second position, the beam path of the laser radiation A within the resonator is not changed. Also the direction and position of the laser radiation A emanating from the resonator are not changed by the adjustment of the optical assembly. However, after adjustment, different areas of the optical components 4.1, 5 of the optical assembly 3 are exposed to the laser radiation. The elements of the optical assembly 4.1', 5' 6' after the adjustment are shown in dashed lines in FIG. 5. The adjustment of the optical assembly 3 can be realized parallel to the surface of the devices for deflecting the laser radiation 4 and/or in the vertical direction (see arrows) and, therefore, all areas of the surface of the device for deflecting the laser radiation 4.1' can be irradiated and all areas of the volume of the device for converting the frequency 5' of the laser radiation A can be penetrated by radiation.

Figure 6A:
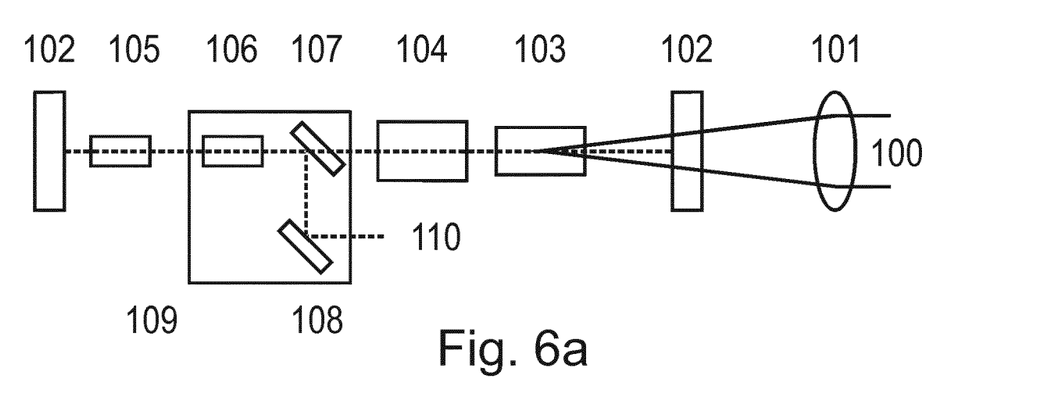
FIG. 6a shows a laser resonator with an internal adjustable optical assembly

FIG. 6a shows a laser system in which a pump beam 100 is focused through a lens 101 onto the laser medium 103. The focused pump beam 100 passes through a resonator mirror 102 that is transparent to the wavelength of the pump beam 100 into the resonator of the laser system. In the laser medium 103, the coherent laser radiation 110 is generated by the pump radiation 100 preferably in the wavelength range of the UV light. The coherent laser beam 110 is guided by the laser medium 103 first through the quality switch (Q switch) 104. Through a mirror 107 that is transparent to selected wavelengths, the laser beam 110 reaches the frequency tripler 106 and the frequency doubler 105. From the second resonator mirror 102, the beam is reflected back into the beam path and divided at the mirror 107 that is transparent to selected wavelengths. Part of the radiation penetrates the mirror 107 that is transparent to selected wavelengths and remains in the resonator. The laser radiation converted by non-linear processes is separated by the mirror 107 that is transparent to selected wavelengths and decoupled from the resonator. A further deflection is made by the mirror 108.

Figure 6B:
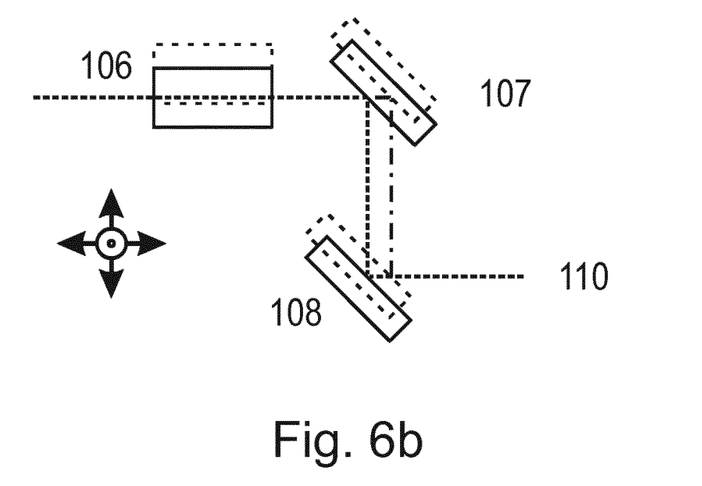
FIG. 6b shows an adjustable optical assembly

In this embodiment, the adjustable optical assembly 109 comprises the frequency tripler 106, the mirror 107 that is transparent to selected wavelengths, and the mirror 108 (see FIG. 6b). This adjustable optical assembly 109 is arranged on a support element. By adjusting the support element, wherein said adjustment is possible in all three spatial directions, each individual element of the adjustable optical assembly 109 is moved by exactly the same distance as each other element of the adjustable optical assembly 109. In that the adjustable optical assembly 109 is adjusted as a whole, the laser beam 110 emanating from the resonator remains in the same position independent of the adjustment of the optical assembly 109. Part of the assembly 109 can also be a crystal for generating the second harmonic.

Moreover, the laser beam can be extended n times after the mirror 108, e.g. for filtering or beam cleaning, by a further mirror pair (see FIG. 6b). Also other optical components such as prisms and optical gratings can be used here.

Figure 7:
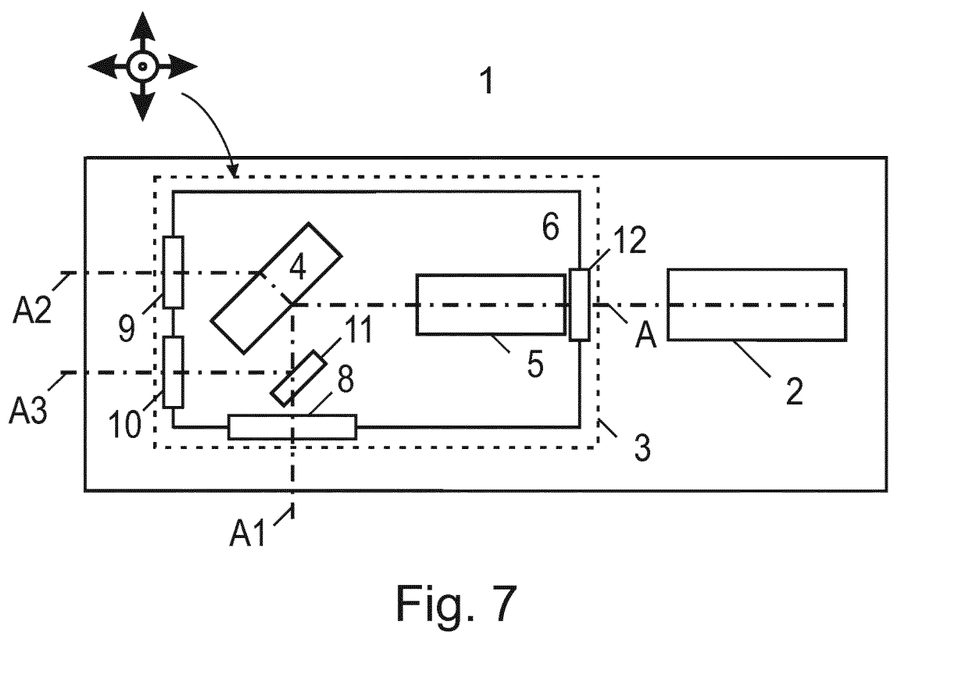

The device for generating laser radiation 1 according to the invention (FIG. 7) comprises an optical assembly 3 and a resonator 2 generating the primary laser radiation A. The optical assembly 3 comprises a device for deflecting the laser radiation 4 and a device for converting the frequency of the laser radiation 5, which can be formed by a plurality of frequency-convertible crystals. Moreover, the optical assembly comprises a Brewster window 8, 9, 10, an airtight chamber in the walls of which the decoupling windows 8, 9, 10 and the coupling window 12 are arranged and in which the optical components 4, 5, 11 are arranged. Both devices 4, 5 lie in the beam path of the laser radiation A generated by the resonator 2. The optical assembly 3 is fixedly connected to a movable carrier element 6 and adjustable by means of the adjustment device 7 in all spatial directions. In an optional embodiment, the Brewster window can also be an antireflection (AR) coated decoupling window or a decoupling window without AR coating. In the embodiment shown in FIG. 7, the device for converting the frequency of the laser radiation 5 comprises a frequency doubler crystal and a frequency tripler crystal which convert the primary laser radiation A of 1064 nm in UV laser radiation of 355 nm. The commonly remaining laser radiation of 1064 nm and 532 nm A1, A2, which is not converted in the frequency tripler crystal, is decoupled simultaneously via the windows 8 and 9. The device for deflecting the laser radiation 4 and the mirror 11 are both configured, as far as possible, as high-transmission separator mirrors for the wavelengths of 1064 nm and 532 nm, respectively. For the wavelength of 355 nm, the device for deflecting the laser radiation 4 and the mirror 11 are, as far as possible, highly reflecting. The UV laser radiation A3 of 355 nm leaves the optical assembly 3 arranged in the airtight chamber via the decoupling window 10. The device for deflecting the laser radiation 4 and the mirror 11 can also have different reflectivity for the given wavelengths. In this connection, the device for deflecting the laser radiation 4 and the mirror 11 can optionally also be highly reflecting for all three wavelengths (1064 nm, 532 nm and 355 nm). The three wavelengths then leave the optical assembly 3 together via the decoupling window 10. When the optical assembly 3 is moved, the position or spreading direction of the decoupled UV laser radiation A3 remains stable. When the laser radiation with the wavelengths 1064 nm and 532 nm is decoupled via the decoupling window 8, the device for deflecting the laser radiation 4 is then configured to be highly reflecting for all three wavelengths (1064 nm, 532 nm and 355 nm).

LIST OF REFERENCE SIGNS 1 device for generating laser radiation
2 resonator
3, 3' optical assembly
4, 4.1, 4.2, 4.1', 4.2' device for deflecting the laser radiation
5, 5' device for multiplying the frequency of the laser radiation
6, 6' support element
7 adjustment device
8, 9, 10 decoupling window, Brewster window
11 mirror
12 coupling window
100 pump beam
101 lens
102 resonator mirror
103 laser medium
104 Q switch
105 frequency doubler
106 frequency tripler
107 mirror being transparent to selected wavelengths
108 mirror
109 adjustable optical assembly
110 laser beam
A beam path of the laser radiation
A' beam path of the laser radiation before adjustment of the assembly
A1, A2, A3 laser radiation after having been passed through the device for multiplying the frequency of the laser radiation
X, X' target area of the laser beam

The invention claimed is:

1. A device for generating laser radiation comprising
a resonator,
an optical assembly,
an adjustment device,
wherein the optical assembly comprises one or more optical components,
wherein the optical assembly comprises a movably arranged support element on which the optical components are arranged,
wherein an optical component is a device for deflecting the laser radiation,
wherein the device for deflecting the laser radiation of the optical assembly is arranged in the beam path of the laser radiation generated by the resonator,
wherein the adjustment device is capable of changing the relative position of the optical assembly from a first position to an other or a plurality of other, positions relative to the resonator,
wherein the position of the beam path of the laser radiation emanating from the optical assembly in the first position remains unchanged by the adjustment of the optical assembly to one of the other positions relative to the resonator.

2. A device for generating laser radiation comprising
a resonator,
an optical assembly, disposed in the resonator;
an adjustment device;
wherein the optical assembly comprises one or more optical components,
wherein the optical assembly comprises a movably arranged support element on which the optical components are arranged,
wherein an optical component is a device for deflecting the laser radiation,
wherein the device for deflecting the laser radiation of the optical assembly is arranged in the beam path of the laser radiation generated by the resonator,
wherein the adjustment device is capable of changing the relative position of the optical assembly from a first position to a plurality of other positions in the resonator,
wherein the position of the beam path of the laser radiation emanating from the optical assembly in the first position remains unchanged by the adjustment of the optical assembly to one of the other positions relative in the resonator.

3. The device for generating laser radiation according to claim 1,
characterized in that
the optical assembly comprises a device for multiplying the frequency of the laser radiation.

4. The device for generating laser radiation according to claim 1, characterized in that
the adjustment device is capable of moving the optical assembly from a first position to one of the other positions by a translation in at least one of the following directions:
parallel to the surface of the device for deflecting the radiation,
perpendicular with respect to the beam path of the device for deflecting the radiation, and parallel to the beam path of the device for deflecting the radiation.

5. The device for generating laser radiation according to claim 1, characterized in that
the optical assembly comprises a second device for deflecting the radiation,
wherein the surface of the second device for deflecting the radiation which deflects the laser radiation is arranged parallel to the surface of the first device for deflecting the radiation which deflects the laser radiation.

6. The device for generating laser radiation according to claim 5, characterized in that
the adjustment device is capable of moving the optical assembly from a first position to one of the other positions by translation in at least one of the following directions:
parallel to the beam path of the laser radiation;
perpendicular with respect to the surface of the second device for deflecting the radiation; and
perpendicular with respect to the beam path of the laser radiation incident from the optical assembly.

7. A method for a device for generating laser radiation according to claim 1,
wherein the optical assembly is moved relative to a resonator from a first position to an other or one of a plurality of other positions.

8. A method for a device for generating laser radiation according to claim 2,
wherein the optical assembly is moved relative in a resonator from a first position to an other or one of a plurality of other positions.

9. The method for improving the lifetime of a device for generating laser radiation according to claim 7,
characterized in that
the optical assembly comprises a device for converting the frequency of the laser radiation, which is moved together with the optical assembly.

10. The method for improving the lifetime of a device for generating laser radiation according to claim 7,
characterized in that
the optical assembly is moved from a first position to another position in a at least one of the following directions:
parallel to the surface of the device for deflecting the radiation;
perpendicular with respect to the beam path of the device for deflecting the radiation; and
parallel to the beam path of the device for deflecting the radiation.

11. The method for improving the lifetime of a device for generating laser radiation according to claim 7,
characterized in that
the optical assembly comprises a second device for deflecting the radiation, which is moved together with the optical assembly.

12. The method for a device for generating laser radiation according to claim 11,
characterized in that
the optical assembly is moved from a first position to one of the other positions in at least one of the following directions:
parallel to the beam path of the laser radiation;
perpendicular to the surface of the device for deflecting the radiation; and
perpendicular to the beam path of the laser radiation incident from the optical assembly.

* * * * *